United States Patent
Gomila

(10) Patent No.: US 7,319,415 B2
(45) Date of Patent: Jan. 15, 2008

(54) CHROMA DEBLOCKING FILTER

(75) Inventor: Cristina Gomila, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 813 days.

(21) Appl. No.: 10/364,429

(22) Filed: Feb. 11, 2003

(65) Prior Publication Data

US 2003/0206587 A1     Nov. 6, 2003

Related U.S. Application Data

(60) Provisional application No. 60/393,328, filed on Jul. 2, 2002, provisional application No. 60/377,061, filed on May 1, 2002.

(51) Int. Cl.
*H03M 7/00* (2006.01)

(52) U.S. Cl. .................. 341/50; 375/240.25

(58) Field of Classification Search .......... 341/50; 375/240.25, 240.24; 382/162
See application file for complete search history.

(56) References Cited

U.S. PATENT DOCUMENTS

| | | | | |
|---|---|---|---|---|
| 4,389,664 A * | 6/1983 | Robitzsch | ............ | 348/592 |
| 6,160,503 A | 12/2000 | Andrews et al. | ............ | 341/94 |
| 6,188,799 B1 | 2/2001 | Tan et al. | ............ | 382/260 |
| 6,215,425 B1 | 4/2001 | Andrews et al. | ............ | 341/94 |
| 6,225,923 B1 | 5/2001 | Andrews | ............ | 341/94 |
| 6,240,135 B1 | 5/2001 | Kim | ............ | 375/240.01 |
| 6,360,024 B1 | 3/2002 | Tan et al. | ............ | 382/260 |
| 6,434,197 B1 | 8/2002 | Wang et al. | ............ | 375/240.29 |
| 6,445,816 B1 * | 9/2002 | Pettigrew | ............ | 382/162 |
| 6,766,063 B2 * | 7/2004 | Gonsalves | ............ | 382/261 |
| 6,807,300 B1 * | 10/2004 | Gindele et al. | ............ | 382/167 |
| 6,907,079 B2 * | 6/2005 | Gomila et al. | ............ | 375/240.25 |
| 7,043,092 B1 * | 5/2006 | Groliere | ............ | 382/268 |
| 2001/0020906 A1 | 9/2001 | Andrews et al. | ............ | 341/94 |

FOREIGN PATENT DOCUMENTS

WO    WO 00/49809    8/2000

* cited by examiner

*Primary Examiner*—Rexford Barnie
*Assistant Examiner*—Joseph Lauture
(74) *Attorney, Agent, or Firm*—Joseph J. Laks; Paul P. Kiel; Guy H. Eriksen

(57) ABSTRACT

An encoder, decoder, and corresponding method are disclosed for deblocking pixel data processed with block transformations, the encoder including a conditional deblocking filter for filtering only block transitions meeting chroma difference measure criteria; the decoder including a conditional deblocking filter for filtering only block transitions meeting chroma difference measure criteria; and the method for deblocking including receiving chroma level signals for at least two pixels disposed on opposite sides of a block transition, computing a distance measure between the chroma levels of the at least two pixels, comparing the distance measure with at least one threshold, and conditionally filtering adjacent pixels including the at least two pixels at the block transition in response to the comparison.

21 Claims, 2 Drawing Sheets

US 7,319,415 B2

CHROMA DEBLOCKING FILTER

CROSS-REFERENCE TO RELATED APPLICATIONS

This application claims the benefit of U.S. Provisional Patent Application Ser. No. 60/393,328, entitled "Simplified Chroma Deblocking Filter" and filed Jul. 2, 2002, which is incorporated herein by reference in its entirety. In addition, this application claims the benefit of U.S. Provisional Patent Application Ser. No. 60/377,061, entitled "Deblocking Filter Simplification Based On Pixel Brightness" and filed May 1, 2002, which is also incorporated herein by reference in its entirety.

FIELD OF THE INVENTION

The present invention is directed towards video encoders and decoders (collectively "CODECs"), and in particular, towards video CODECs with deblocking filters.

BACKGROUND OF THE INVENTION

Video data is generally processed and transferred in the form of bit streams. A video encoder generally applies a block transform coding, such as a discrete cosine transform ("DCT"), to compress the raw data. A corresponding video decoder generally decodes the block transform encoded bit stream data, such as by applying an inverse discrete cosine transform ("IDCT").

Deblocking filters are often used in conjunction with block-based digital video compression systems. A deblocking filter can be applied inside the compression loop, where the filter is applied at the encoder and at the decoder. Alternatively, a deblocking filter can be applied after the compression loop at only the decoder.

A typical deblocking filter works by applying a low-pass filter across the edge transition of a block where block transform coding (e.g., DCT) and quantization was performed. Deblocking filters can reduce the negative visual impact known as "blockiness" in decompressed video, but generally require a significant amount of computational complexity at the video decoder and/or encoder. Accordingly, it is desirable to reduce the computational cost of deblocking in block-based digital video compression CODECs.

SUMMARY OF THE INVENTION

These and other drawbacks and disadvantages of the prior art are addressed by a system and method for a chroma deblocking filter.

An encoder, decoder, and corresponding method are disclosed for deblocking pixel data processed with block transformations, the encoder including a conditional deblocking filter for filtering only block transitions meeting pre-selected chroma difference measure criteria; and the decoder including a conditional deblocking filter for filtering only block transitions meeting pre-selected chroma difference measure criteria.

The corresponding method for deblocking includes receiving signals indicative of the chroma levels of two pixels, one at each side of the block transition, computing a distance measure between both chroma levels, comparing this distance measure to a threshold, and conditionally filtering the pixel and the adjacent pixels at the block transition in response to the comparison.

These and other aspects, features and advantages of the present invention will become apparent from the following description of exemplary embodiments, which is to be read in connection with the accompanying drawings.

BRIEF DESCRIPTION OF THE DRAWINGS

The present invention encompasses a chroma deblocking filter in accordance with the following exemplary figures, in which.

DETAILED DESCRIPTION OF PREFERRED EMBODIMENTS

Figure 1:
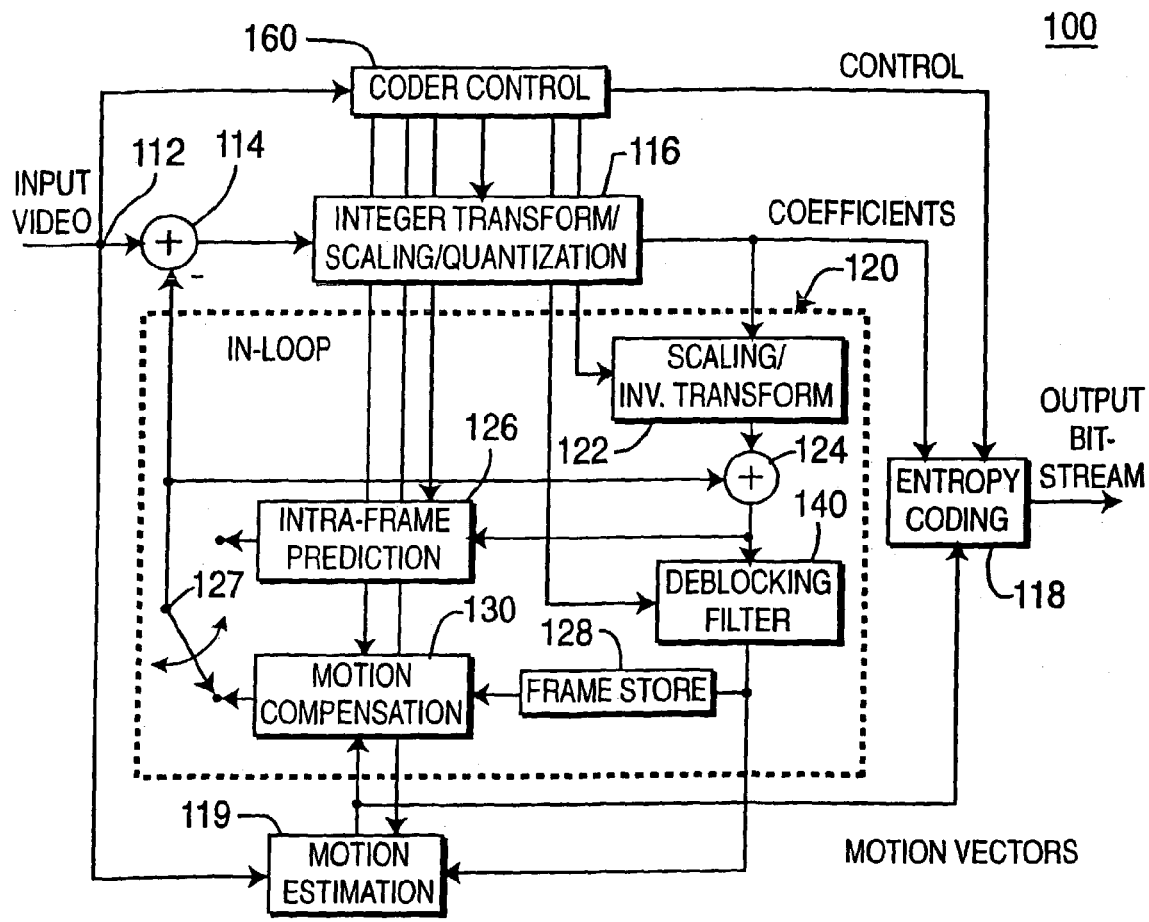
FIG. 1 shows a block diagram for an exemplary encoder having an in-loop chroma deblocking filter.

Implementation of a deblocking filter generally requires a significant amount of computational complexity at the video decoder and/or encoder. Determination of whether or not to filter a particular edge transition and the particular filter used to perform the filtering operation each have a large impact on both the computational complexity and the perceived visual quality.

Implementation of a deblocking filter in a block-based digital video compression system can be simplified by deciding whether or not to apply a low-pass filter at a block transition based on a chroma difference measure between the pixels at the transition. Thus, the computational complexity can be reduced by omitting application of a deblocking filter to transitions were it would not improve the perceived visual quality.

The present invention reduces the computational complexity of a deblocking filter without significantly impacting the perceived visual quality, by deciding whether or not to apply a low-pass or deblocking filter at a block transition based on the chroma difference measure of the pixels at the transition. Therefore, the computational costs associated with deblocking in a block-based digital video compression CODEC are reduced. Preferred embodiments leverage the idea that the number of operations required to deblock one frame can be greatly reduced when chroma deblocking skips over edges that present a gap or difference measure smaller than a given threshold. No deblocking is applied in cases below the threshold.

In the ITU-T Recommendation H.263 video compression standard, the strength of the particular deblocking filter to be applied depends upon the quantization parameter used to encode a given macroblock. In the proposed ITU-T Recommendation H.264 I ISO/IEC14496-10 AVC video compression standard ("H.264/AVC"), several factors are used to determine whether or not to filter a transition and the strength of the filter to apply. These factors include whether the block was intra-coded or inter-coded, whether non-zero coefficients were present in the block, the magnitude of the difference in motion vectors of blocks across the edge, and the magnitude of the difference in pixel values across the edge. The first three factors refer to block-based criteria that can be computed prior to deblocking. The fourth factor includes criteria that are computed at a pixel level to avoid blurring real contours. However, none of the prior approaches have considered the inclusion of a criterion to avoid filtering the chroma edges with a gap too small to be effectively affected by the low-pass filters.

The following description merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

As shown in FIG. 1, an exemplary encoder having an in-loop chroma deblocking filter is indicated generally by the reference numeral 100. The encoder 100 includes a video input terminal 112 that is coupled in signal communication to a positive input of a summing block 114. The summing block 114 is coupled, in turn, to a function block 116 for implementing an integer transform to provide coefficients. The block 116 is coupled to an entropy coding block 118 for implementing entropy coding to provide an output bitstream. The block 116 is further coupled to an in-loop portion 120 at a scaling and inverse transform block 122. The block 122 is coupled to a summing block 124, which, in turn, is coupled to an intra-frame prediction block 126. The intra-frame prediction block 126 is switchably coupled to a switch 127, which, in turn, is coupled to a second input of the summing block 124.

The output of the summing block 124 is coupled to a conditional deblocking filter 140. The deblocking filter 140 is coupled to a frame store 128. The frame store 128 is coupled to a motion compensation block 130, which is coupled to a second alternative input of the switch 127. The video input terminal 112 is further coupled to a motion estimation block 119 to provide motion vectors. The deblocking filter 140 is coupled to a second input of the motion estimation block 119. The output of the motion estimation block 119 is coupled to the motion compensation block 130 as well as to a second input of the entropy coding block 118.

The video input terminal 112 is further coupled to a coder control block 160. The coder control block 160 is coupled to control inputs of each of the blocks 116, 118, 119, 122, 126, 130, and 140 for providing control signals to control the operation of the encoder 100.

Figure 2:
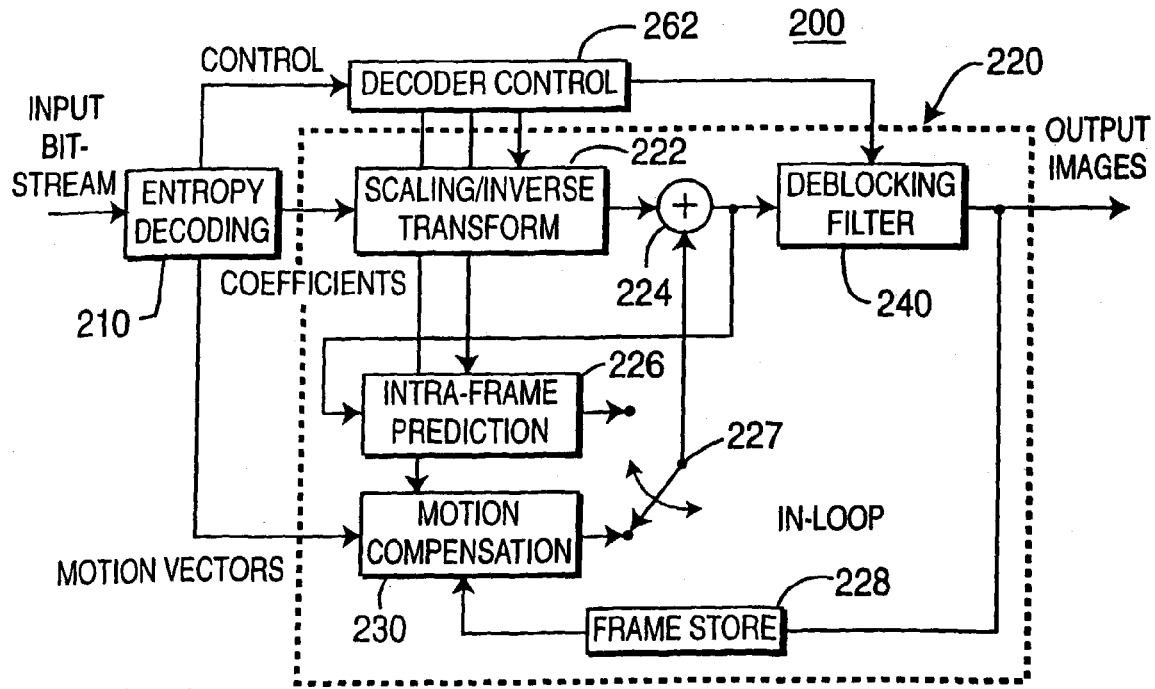
FIG. 2 shows a block diagram for an exemplary decoder having an in-loop chroma deblocking filter and usable with the encoder of FIG. 1.

Turning to FIG. 2, an exemplary decoder having an in-loop chroma deblocking filter is indicated generally by the reference numeral 200. The decoder 200 includes an entropy decoding block 210 for receiving an input bitstream. The decoding block 210 is coupled for providing coefficients to an in-loop portion 220 at a scaling and inverse transform block 222. The block 222 is coupled to a summing block 224, which, in turn, is coupled to an intra-frame prediction block 226. The intra-frame prediction block 226 is switchably coupled to a switch 227, which, in turn, is coupled to a second input of the summing block 224.

The output of the summing block 224 is coupled to a conditional deblocking filter 240 for providing output images. The deblocking filter 240 is coupled to a frame store 228. The frame store 228 is coupled to a motion compensation block 230, which is coupled to a second alternative input of the switch 227. The entropy decoding block 210 is further coupled for providing motion vectors to a second input of the motion compensation block 230.

The entropy decoding block 210 is further coupled for providing input to a decoder control block 262. The decoder control block 262 is coupled to control inputs of each of the blocks 222, 226, 230, and 240 for communicating control signals and controlling the operation of the decoder 200.

Figure 3:
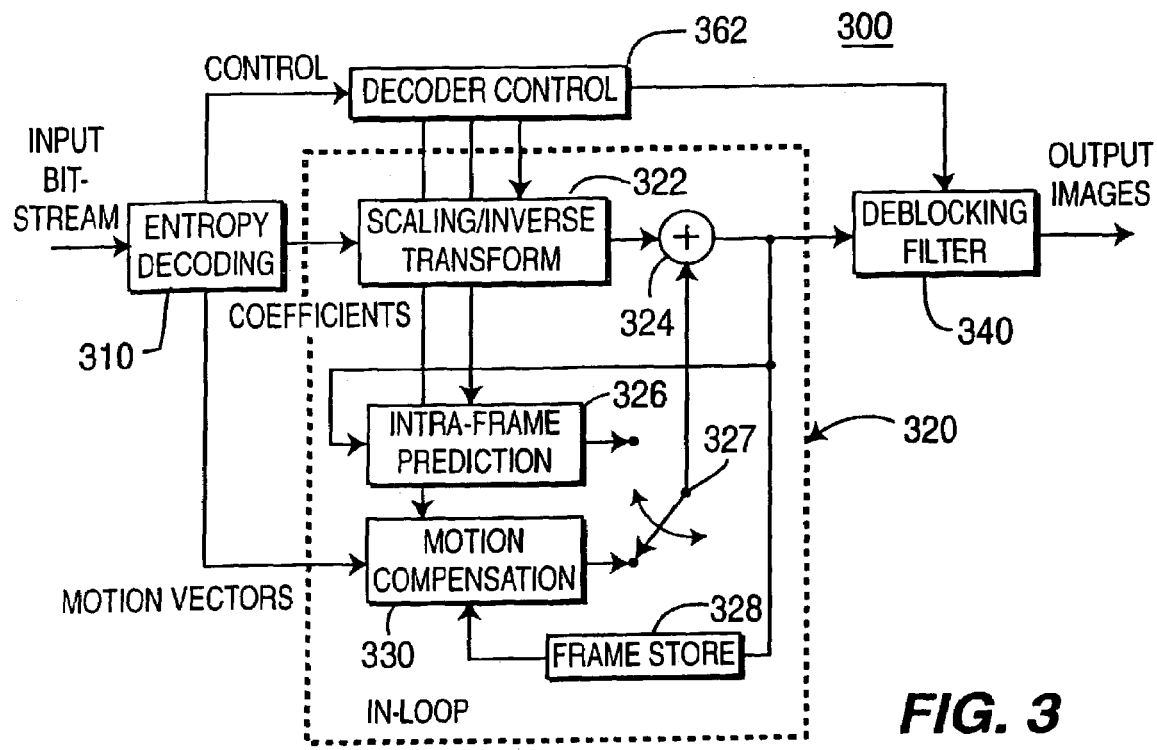
FIG. 3 shows a block diagram for an exemplary decoder having a post-processing chroma deblocking filter.

Turning now to FIG. 3, an exemplary decoder having a post-processing chroma deblocking filter is indicated generally by the reference numeral 300. The decoder 300 includes an entropy decoding block 310 for receiving an input bitstream. The decoding block 310 is coupled for providing coefficients to an in-loop portion 320 at a scaling and inverse transform block 322. The block 322 is coupled to a summing block 324, which, in turn, is coupled to an intra-frame prediction block 326. The intra-frame prediction block 326 is switchably coupled to a switch 327, which, in turn, is coupled to a second input of the summing block 324.

The output of the summing block 324 is coupled to a conditional deblocking filter 340 for providing output images. The summing block 324 is further coupled to a frame store 328. The frame store 328 is coupled to a motion compensation block 330, which is coupled to a second alternative input of the switch 327. The entropy encoding block 310 is further coupled for providing motion vectors to a second input of the motion compensation block 330.

The entropy decoding block 310 is further coupled for providing input to a decoder control block 362. The decoder control block 362 is coupled to control inputs of each of the blocks 322, 326, 330, and 340 for communicating control signals and controlling the operation of the decoder 300.

Figure 4:
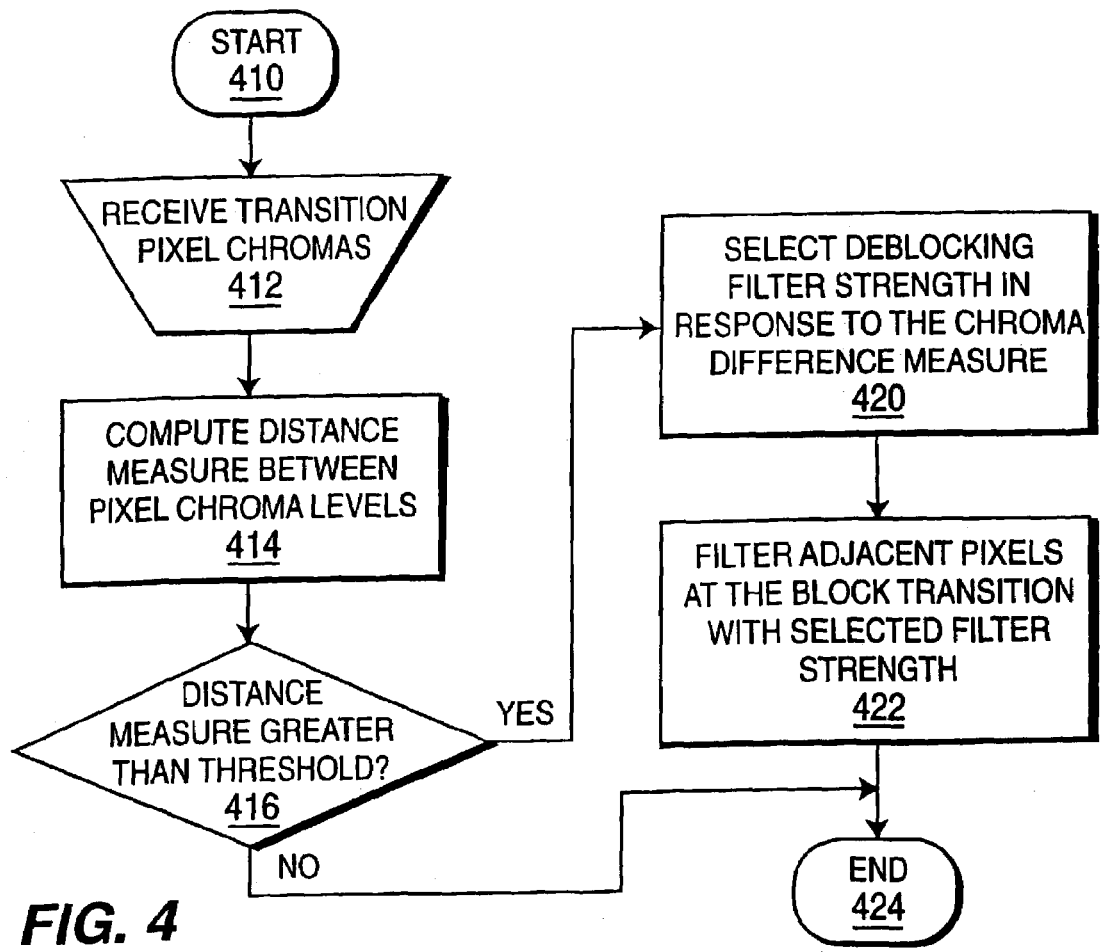
FIG. 4 shows a flow diagram for a chroma deblocking filter in accordance with the principles of the present invention.

As shown in FIG. 4, the processes of an exemplary chroma deblocking filter is indicated generally by the reference numeral 400. The processes 400 include a start step 410 that passes control to an input step 412 for receiving chroma levels of two pixels adjacent to opposite sides of a block transition. The input step 412 passes control to a step 414 for computing a distance measure between the chroma levels of the two pixels. The step 414 passes control to a decision step 416 for comparing the chroma distance measure with a threshold. If the distance measure is not greater than the threshold, no deblock filtering is performed and control passes to an end step 424. Otherwise, the step 416 passes control to a function step 420 for selecting a deblocking filter strength to be applied in response to the difference measure. The step 420 passes control to step 422 for conditionally filtering a plurality of adjacent pixels including the first two pixels at the block transition in response to the threshold comparison. Finally, step 422 passes control to the end step 424.

In operation of embodiments of the present invention, the computational complexity of a deblocking filter in an image or video compression system is reduced by not performing deblocking filtering and/or reducing the filter strength for any given block in response to conditions applied to difference measures of the chroma level values of the pixels at or near the block boundary transitions. Application of the deblocking filter on the chroma components is eliminated, or the filter strength reduced, for those transitions presenting chroma signal levels at both sides of the transition too similar to be significantly changed by a low-pass filter. Thus, for these regions, application of a deblocking filter would have required additional computations but would not have sufficiently improved the perceived video quality to human viewers.

In a preferred embodiment, the decision to filter or not to filter is incorporated into a system that uses other criteria to make deblocking filter decisions, such as those used in the H.264/AVC compression standard, for example. In an exemplary configuration, the deblocking algorithm proceeds in three steps when it is applied to a transition. In one step the algorithm determines whether or not the current transition will be filtered. For those cases where it determines to filter, there is another step in which the filter or strength thereof to be applied is selected. An additional step begins the filtering process itself, where the values of a certain number of pixels surrounding the block edge are modified in order to smooth this transition.

An exemplary set of eight pixels involved in filtering a transition of one of the lines or rows crossing the edge between two blocks P and Q is denoted by the following notation:

| $p_3$ | $p_2$ | $p_1$ | $p_0$ | $q_0$ | $q_1$ | $q_2$ | $q_3$ |
| --- | --- | --- | --- | --- | --- | --- | --- | where the block edge is located between $p_0$ and $q_0$. Current H.264/AVC criteria impose that a chroma transition should be filtered if and only if:

$$|p_0-q_0|<\alpha \text{ and } |p_0-p_1|<\beta \text{ and } |q_0-q_1|<\beta$$

where $\alpha$ and $\beta$ are both thresholds dependant on the quantization step. These conditions are intended to avoid deblocking the real contours of the objects. Real contours can be differentiated from the block artifacts because of the stronger transitions.

However, none of these criteria check whether the magnitude of the difference in pixel values across the edge was large enough to be smoothed by the filter. Thus, in many cases where the difference between $p_0$ and $q_0$ was small, the pixel values after filtering were very close to the original ones and the result of this type of deblocking was not useful. In these cases, very common for chroma signals, all the computations incurred by the algorithm did not generate a worthwhile gain in terms of visual quality.

Embodiments of the present invention reduce the number of computations required to deblock a color image by imposing a condition on the minimal magnitude of a distance measure between pixel chroma component values across the edge. One exemplary distance measure is an arithmetic difference, and alternative distance measures may be contemplated by those of ordinary skill in the pertinent art to meet application-specific design criteria. Application of the deblocking filter is skipped for all the chroma transitions with a gap too small to be significantly changed by a smoothing filter. This criterion can be expressed as:

$$\text{distance}(\text{Chroma}(p_0)-\text{Chroma}(q_0))>d_{min}$$

where the value of the threshold $d_{min}$ represents the minimal chroma gap required to apply the deblocking filter. If the two chroma components of a color signal are filtered together, a single vector distance between the chroma values of pixels $p_0$ and $q_0$ is computed. If the two chroma components of a color signal are filtered independently, this criterion applies to each component in a separate process by means of a one-dimensional distance.

As an example, the criterion applied to the deblocking of the chroma components of a YUV signal, when they are processed independently, could be expressed as follows:

$$|U(p_0)-U(q_0)|>d_{min}$$

$$|V(p_0)-V(q_0)|>d_{min}$$

where the distance used corresponds to the L1 norm. Experimental results show a significant savings in computation with a minimal degradation of the visual quality for $d_{min}=1$. In alternate embodiments, other distance measures and/or larger values of $d_{min}$ may be considered for a correspondingly larger reduction in complexity.

The criterion is not applied to all of the color components (i.e., Y, U and V), but only to the chroma components (i.e., U and V), which are generally affected because of the low dynamic range of their pixel values. Adding complexity to the deblocking of the luma (i.e., Y) component is not worthwhile.

In one embodiment of the present invention, the decision to filter or not to filter the chroma components is incorporated into a system that uses other criteria to make deblocking filter decisions, such as those used in the H.264/AVC compression standard. In this embodiment, only those transitions that satisfy both the basic H.264/AVC and the presently disclosed additional conditions will be filtered.

When applied to the H.264/AVC JM2.1 reference software, the invention reduced the complexity of filtering the chroma components by 60%, which represents 30% of the overall number of computations. In this case, only one new comparison was added since the value of $|p_0-q_0|$ was already present. The visual impact on the decoded images has been estimated imperceptible for a non-expert viewer under common display conditions. Only for high compression ranges, such as those with a quantizer parameter ("QP") greater than about 24, were expert viewers able to detect a slight degradation for some of the test sequences.

Thus, this new criterion for conditional deblocking filters increases the number of operations involved in the decision process, but achieves an overall reduction in computational complexity because of the computations saved when the decision is made not to filter some line transitions. Experiments have shown that the reduction in operations comes without a significant loss of visual quality.

These and other features and advantages of the present invention may be readily ascertained by one of ordinary skill in the pertinent art based on the teachings herein. It is to be understood that the principles of the present invention may be implemented in various forms of hardware, software, firmware, special purpose processors, or combinations thereof.

Most preferably, the principles of the present invention are implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may either be part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which embodiments of the present invention are programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A method for deblocking pixel data processed with block transformations, the method comprising:
   receiving signals indicative of the chroma levels of at least two pixels being disposed on opposite sides of a block transition, respectively;
   computing a distance measure between the chroma levels of the at least two pixels;
   comparing the distance measure with at least one threshold; and
   conditionally filtering, responsive to said comparing step, a plurality of adjacent pixels including the at least two pixels at the block transition, when the distance measure is greater than a threshold.

2. A method as defined in claim 1, further comprising selecting a deblocking filter strength to be applied in response to the distance measure.

3. A method as defined in claim 1 wherein there are approximately four pixels conditionally filtered from each side of the block transition, said pixels being disposed along a line that crosses the block transition.

4. A method as defined in claim 1 wherein the value of the at least one threshold is approximately 1.

5. A method as defined in claim 1 wherein the step of conditionally filtering is applied separately for each pixel adjacent to a transition and filtering is omitted only for blocks where all pixels at the transition fall outside the threshold.

6. A method as defined in claim 1, further comprising averaging a plurality of adjacent pixels including at least one of the at least two pixels wherein the provided chroma level signals are indicative of the average chroma levels of the plurality of adjacent pixels.

7. A method as defined in claim 6 wherein filtering is omitted only for blocks where the average chroma at the transition falls outside the threshold.

8. A method as defined in claim 1 wherein the conditional filtering is line-based.

9. A method as defined in claim 1 wherein the conditional filtering is block-based.

10. A method as defined in claim 1, further comprising:
    encoding the pixel data as a plurality of block transform coefficients; and
    conditionally deblocking the pixel data within a feedback loop.

11. A method as defined in claim 1, further comprising:
    decoding the pixel data from a plurality of block transform coefficients; and
    conditionally deblocking the pixel data within a feedback loop.

12. A method as defined in claim 1, further comprising:
    decoding the pixel data from a plurality of block transform coefficients; and
    conditionally deblocking the pixel data after a feedback loop.

13. A method as defined in claim 1, further comprising:
    receiving a quantizer parameter; and
    conditionally filtering only if the value of the quantizer parameter is less than approximately.

14. An encoder for encoding pixel data as a plurality of block transform coefficients, the encoder comprising a conditional deblocking filter for filtering only block transitions having a chroma distance measure greater than a threshold.

15. An encoder as defined in claim 14, the conditional deblocking filter comprising:
- receiver means for receiving signals indicative of the chroma levels of at least two pixels being disposed on opposite sides of a block transition, respectively;
- computing means for computing a distance measure between the chroma levels of the at least two pixels;
- comparison means responsive to the computing means for comparing the distance measure with at least one threshold; and
- filter means responsive to the comparison means for conditionally filtering a plurality of adjacent pixels including the at least two pixels at the block transition in response to the comparison.

16. An encoder as defined in claim 15, the conditional deblocking filter further comprising filter strength means for selecting a deblocking filter strength to be applied in response to the distance measure.

17. A decoder for decoding encoded block transform coefficients to provide reconstructed pixel data, the decoder comprising a conditional deblocking filter for filtering only block transitions having a chroma distance measure greater than a threshold.

18. A decoder as defined in claim 17 wherein the conditional deblocking filter comprises:
- receiver means for receiving signals indicative of the chroma levels of at least two pixels being disposed on opposite sides of a block transition, respectively;
- computing means for computing a distance measure between the chroma levels of the at least two pixels;
- comparison means responsive to the computing means for comparing the distance measure with at least one threshold; and
- filter means responsive to the comparison means for conditionally filtering a plurality of adjacent pixels including the at least two pixels at the block transition in response to the comparison.

19. A decoder as defined in claim 18, the conditional deblocking filter further comprising filter strength means for selecting a deblocking filter strength to be applied in response to the difference measure.

20. A decoder as defined in claim 17 wherein the conditional deblocking filter is disposed within a feedback loop for deblocking during motion compensation.

21. A decoder as defined in claim 17 wherein the conditional deblocking filter is disposed after a feedback loop for deblocking after motion compensation.

* * * * *